W. E. BROCK.
Manufacture of Compound Lumber.
No. 206,534.          Patented July 30, 1878.
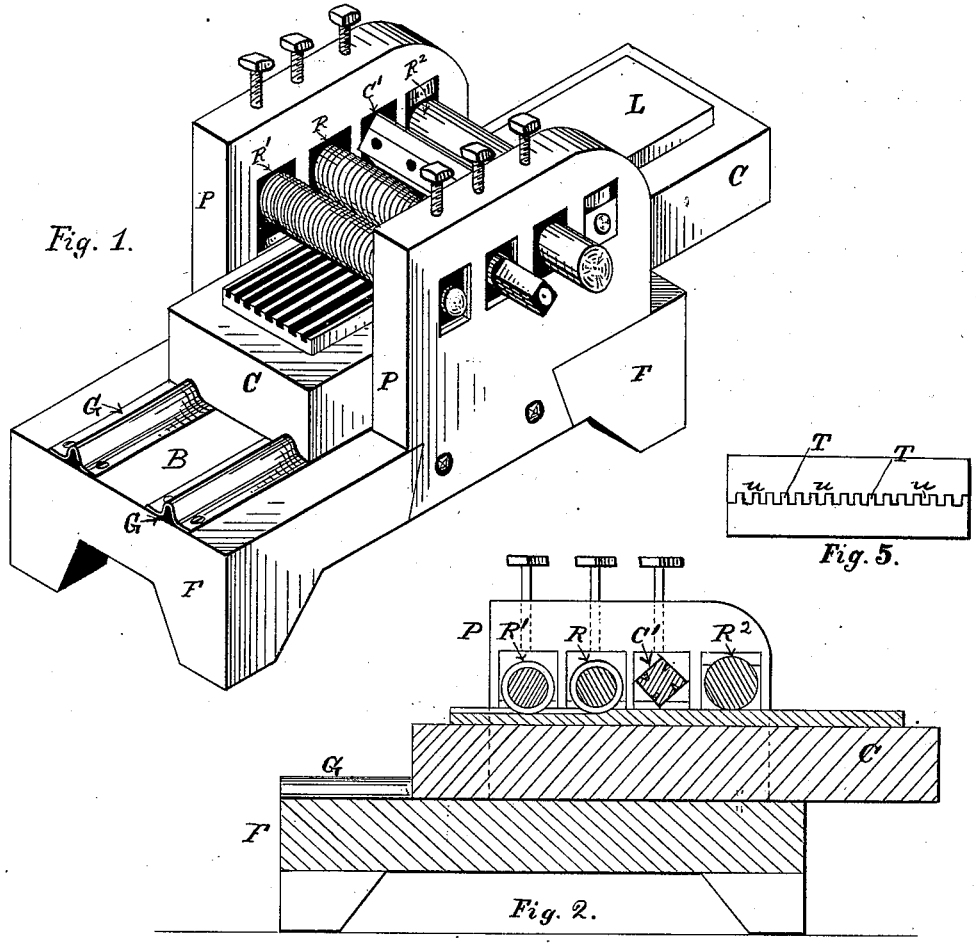
Witnesses:
Theodore R. Sheat.
George A. Hammel.
Inventor:
William E. Brock

UNITED STATES PATENT OFFICE.

WILLIAM E. BROCK, OF NEW YORK, ASSIGNOR OF ONE-HALF HIS RIGHT TO JANE THOMPSON, OF BROOKLYN, N. Y.

IMPROVEMENT IN THE MANUFACTURE OF COMPOUND LUMBER.

Specification forming part of Letters Patent No. 206,534, dated July 30, 1878; application filed May 31, 1878.

*To all whom it may concern:*

Be it known that I, WILLIAM E. BROCK, of No. 1080 Second avenue, in the city, county, and State of New York, have invented a new and useful Improvement in Machinery for Manufacturing Compound Lumber, in the product thereof, and in the method of making the same, of which the following is a specification:

The invention relates to a machine for grooving or channeling the surfaces of woods, to be thereafter put together in the forms and shapes shown in the Letters Patent granted to Daniel M. Cummings, October 10, 1876, No. 183,042, and in other like Letters Patent, to the improvement in the art employed, and to the improved product thereof.

I am not aware that hitherto it has ever been attempted to form tongues and grooves in the faces or sides of boards, or other kinds of lumber, by means of compressing grooved rollers or other grooving-tools, the tongues and grooves being intended to be thereafter brought together under pressure, so as to be solidly joined as one piece.

It has been customary hitherto to form such tongues and grooves by means of a cutter provided with cutter-teeth having parallel sides, and arranged to cut out the channels or grooves lengthwise, removing the fiber of the wood therefrom, and leaving the tongue standing undisturbed in the position or density of the fibers thereof. The objections to this method are that the cutters, being necessarily provided with fine teeth-like cutting-edges, do not endure the rapid action required to perform any considerable and profitable amount of work, but become easily heated, injured, and useless, until reshaped and sharpened again at considerable expense; and that, when the tongues and grooves are so formed, the tongues, not being compressed, are liable to shrink so as to become smaller than the grooves in which they lie, and are wanting in capacity for elastic pressure outward on each side against the two adjoining tongues; whereas in my invention the rolls and ribs are solid and firm, do not cut, tear, nor split the lumber, but, on the contrary, hold firm for treatment lumber already split or cracked without injury, and form elastic tongues having such properties as to do away with any necessity for glue or cement, and at the same time produce lumber of greater strength and solidity than the original.

The objects of my invention are to provide a new system of making the tongues and grooves, for the purpose of making compound lumber therefrom by compression; to provide a machine with properly-grooved rolls, bed and feeding rolls; to make the same rapidly and accurately; and to produce an improved article of manufacture consisting of compound lumber, the tongues and grooves of which are composed of compressed wood.

The invention consists in the improvement in the art of forming tongues and grooves in the surfaces of lumber by compression; in the improved article of compound lumber produced therefrom; in the combination of the two rolls provided with annular ribs arranged to operate in the same grooves in the lumber, in the order and for the purposes hereinafter named; in the combination of the two annular ribbed rolls and the cutter for producing a smooth surface for their operation, and also of these with the feed-roll; and in the combination of the two annular-ribbed rolls, separately and together, with a movable carriage for moving and supporting the lumber in contact therewith during its treatment thereby.

In the accompanying drawing, in which similar letters of reference indicate like parts, Figure 1 is a perspective view of a machine for making tongues and grooves, showing the working parts. Fig. 2 is a longitudinal sectional view of same. Fig. 3 is a front view of the roll with annular V-shaped ribs, represented at bottom as embedded in the wood surface, as in forming grooves therein. Fig. 4 is a similar view of the tongue-and-groove finishing-roll, and Fig. 5 is a cross-sectional view of the finished compound lumber.

F is the frame of the machine, provided with the upright pillow-blocks P P on each side to receive the ends of the rolls and cutter-shaft. These, like the whole structure, should be made strong enough to withstand the strains incident to the kind of wood or material to be worked therein.

The bed B is provided with the guides G G, on which slides the carriage C. The carriage should be level and pass under the cutter C', so as to leave the lumber true from end to end. It may be made in the form of an endless carriage or bed, or it may consist of rollers.

R is the roll which carries the annular V-shaped ribs; R¹, the finishing-roll, with annular ribs having parallel sides; and R² is the feed-roll.

The operation of the machine is simple, as follows: The piece of lumber L to be operated upon is placed on the carriage C, so as to be engaged by the feed-roll R², and thereby carried under the cutter C', which planes its upper surface in the usual manner. The feed-roll forces the piece beyond the cutter under the roll R, which produces therein the grooves V V, and thereafter under the roll R¹, which produces the grooves U U with parallel sides. The thus grooved faces of two pieces of lumber, L, being brought together and subjected to pressure, even without glue, will engage and be held together by the tongues T T. The roll R¹, with V-shaped grooves and ribs in cross-section, may be used alone, if sufficient power be applied, to form the parallel tongues and grooves; but in that case the wood will be more condensed in the bottoms of the channels and grooves than in the tongues, resulting probably in a tendency to swell when exposed to moisture, and to push the tongues out of the grooves, whereas by using, first, the roll R with V-shaped ribs, the wood of the entire surface and to the depth to which the ribs penetrate is pressed laterally and left in V shape as to its cross-section, and also partly condensed or solidified. The ribs on the roll R¹ being then made to follow in the same grooves in the wood, their edges first come in contact with their beveled sides somewhat below the surface of the board, and force the fiber of the wood sidewise, so as to leave it condensed in the tongues, and putting the two tongued and grooved surfaces together, as in Fig. 5, under pressure, the tendency, under that pressure and also under the influence either of the natural resilience of the recently-compressed wood, or under the influence of expansion at any time resulting from the absorption of moisture or other cause, will be to press outward at right angles to the general surface of the wood and in opposite directions, so as to cause the tongues to hold to each other by a constant pressure and gripe sufficient to do away with all necessity for glue or cement between the surfaces and tongues and grooves of the parts composing the compound lumber.

As shown in Fig. 5, the number of tongues and grooves per inch is about sixteen. This number may be varied to some extent, and in case of employing thicker lumber may be made deeper at will.

The annular ribs on the rolls R and R¹ should be in each respectively of the same size and distance apart, and the two rolls should be so fixed in the machine that the ribs of the last in order, R¹, shall follow and strike uniformly in the incipient V-shaped grooves, for the purpose of pressing the wood evenly to each side and of forming the tongues T with parallel sides having a somewhat uniform tendency to expand laterally in reaction from the effects of compression.

I claim as my invention—

1. The improvement in the art of forming tongues and grooves in the adjoining surfaces of the parts used in making compound lumber described, consisting in forming the grooves and intermediate tongues by compression.

2. As an improved article of manufacture, compound lumber composed of two or more layers of wood, the adjoining surfaces of which are provided with interlocking tongues and grooves, and the tongues of which consist of the original surface of wood to the same depth condensed therein.

3. In combination, the rolls R and R¹, the former provided with annular ribs having beveled V-shaped sides and the latter with annular ribs having parallel sides, the latter arranged to run in the grooves first made by the former, as shown and described.

4. In combination, the roll R, provided with annular ribs having V-shaped sides, the roll R¹, having annular ribs provided with parallel sides and spaces between the same, and the cutter C', provided with a knife or knives for preparing a smooth surface for the operations of the rolls R and R¹, substantially as described.

5. The rolls R and R¹, the cutter C', and the roll R² in combination, as shown and described.

6. The roll R, provided with annular ribs having beveled or V-shaped sides, in combination with a movable carriage arranged to support and carry lumber under the ribs to be grooved, as shown and described.

7. The roll R¹, provided with annular ribs having parallel sides, in combination with a movable carriage arranged to support and carry lumber under the ribs to be grooved, as shown and described.

8. The roll R, the roll R¹, and the carriage C or movable bed in combination, as and for the purposes set forth.

WILLIAM E. BROCK.

Witnesses:
THEODORE R. SHEAR,
GEORGE A. HAMMEL.